United States Patent [19]
Kim

[11] Patent Number: 6,081,651
[45] Date of Patent: *Jun. 27, 2000

[54] APPARATUS FOR REPRODUCING DATA FROM A DISK-TYPE RECORDING MEDIUM AND METHOD THEREOF

[75] Inventor: Jong Nam Kim, Seoul, Rep. of Korea

[73] Assignee: LG Electronics Inc., Seoul, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 08/774,219

[22] Filed: Dec. 27, 1996

[30] Foreign Application Priority Data

Dec. 29, 1995 [KR] Rep. of Korea ............... 95-67381

[51] Int. Cl.⁷ .................................................. H04N 5/917
[52] U.S. Cl. .......................... 386/111; 386/125; 369/60
[58] Field of Search .................................. 386/6, 21, 46, 386/68, 81–82, 109, 111–113, 116, 125; 369/54, 58, 60, 44.28; H04N 5/917

[56] References Cited

U.S. PATENT DOCUMENTS

| | | | |
|---|---|---|---|
| 4,887,253 | 12/1989 | Tateishi | 386/113 |
| 4,901,166 | 2/1990 | Kojima | 386/113 |
| 5,055,938 | 10/1991 | Misumi et al. | 386/113 |
| 5,177,729 | 1/1993 | Muramatsu et al. | 386/113 |
| 5,258,852 | 11/1993 | Kamijima | 386/113 |
| 5,398,072 | 3/1995 | Auld | 348/426 |
| 5,432,769 | 7/1995 | Honjo | 369/60 |
| 5,457,672 | 10/1995 | Shinada et al. | 369/47 |
| 5,463,607 | 10/1995 | Roth et al. | 369/60 |
| 5,627,809 | 5/1997 | Honjo | 386/111 |
| 5,649,047 | 7/1997 | Takahashi et al. | 386/111 |
| 5,671,204 | 9/1997 | Yokouchi et al. | 369/60 |
| 5,715,354 | 2/1998 | Iwamura et al. | 386/68 |

*Primary Examiner*—Wendy Garber
*Assistant Examiner*—Vincent F. Boccio

[57] ABSTRACT

An apparatus and method for reproducing data from a recording medium includes a reproducing unit reproducing data from a medium, each data including an identification number corresponding to said each data; a decoder including an internal memory, storing the data from the reproducing unit in the internal memory, decoding the data stored in the internal memory, and generating a first signal indicating that the internal memory is full; and a controller receiving the first signal from the decoder, generating a jump signal to the reproducing unit based on the first signal to move a reader of the reproducing unit from the current position to a predetermined prior position on the medium, generating a second signal to the decoder for instructing the decoder to stop storing the data from the reproducing unit, and generating a third signal when the reader reaches the current position on the disc from the predetermined initial position. The third signal instructs the decoder to resume its storing process in the internal memory of the decoder.

15 Claims, 3 Drawing Sheets

APPARATUS FOR REPRODUCING DATA FROM A DISK-TYPE RECORDING MEDIUM AND METHOD THEREOF

BACKGROUND OF THE INVENTION

1. Field of the Invention

The present invention relates to a VBR (variable Bit Rate) data processor and its processing method for a DVD (Digital Video Disc) player, and in particular to an improved VBR data processor for a DVD player which is capable of processing a data having a VBR without using an additional memory for storing a video data and a control logic circuit for controlling the memory.

2. Description of the Conventional Art

FIG. 1 is a block diagram illustrating a conventional VBR data processor for a DVD player.

As shown therein, the conventional VBR data processor for a DVD player includes a pickup apparatus 102 for reading a data written on a disc 101, a servo unit 103 for driving the pickup apparatus 102 and for amplifying the data read from the disc 101, a demodulation and error correction unit 104 for demodulating the data from the servo unit 103, correcting the error of the demodulated data, and outputting a data DATA1, a memory 105 for storing the data DATA1 from the modulation and error correction unit 104 in a predetermined portion of the memory 105 in accordance with a write address WA, an MPEG (Motion Picture Experts Group) decoder 107 for storing a data DATA2 from the memory 105 in an internal memory, coding the data for a motion picture compression, generating a video data VIDEO and an audio data AUDIO, and outputting a data request signal DATA_REQ, and a VBR controller 106 for supplying the write address WA to the memory 105 and a read address RA to the memory 105 in accordance with the data request signal DATA_REQ from the MPEG decoder 107 so that the data DATA2 is outputted to the MPEG decoder 107, for comparing the write address WA with the read address RA, and outputting a back track jump signal JUMP to the servo unit 103.

The VBR controller 106 includes a write address generator 106a for generating a write address WA, a read address generator 106b for generating a read address RA, and a comparator 106c for comparing the write address WA with the read address RA.

The operation of the VBR data processor of a conventional DVD player will now be explained with reference to the accompanying drawings.

As shown in FIG. 2, the data written on the disc 101 is classified into a synchronous pattern region for a synchronization of a block and sector, a region for an identification number ID of the block or sector, and a user data region which is an ordinary data region.

In the CBR (Constant Bit Rate) which is contrary to the VBR, the data transmission rate is constant, and the motor for driving the disc is rotated at a predetermined speed for the transmission rate of the data.

However, since the transmission rate of the date is variable, the motor is rotated at a predetermined speed for the maximum data transmission rate. If the apparatus as shown in FIG. 1 has the maximum data transmission rate, there are no problem. But, if the apparatus, as shown in FIG. 1 has a low transmission rate, the data read from the disc 101 may be over-flown.

In order to store the over-flown data, the memory 105 is additionally needed. In addition, if the data is over-flown from the memory 105 as well, the servo unit 103 must move the pickup apparatus 102 from the current position of the disc to another position which has been read previously by the pickup apparatus 102.

While the pickup apparatus 102 is being moved to the another position, the previously read data are disregarded. In addition, the MPEG decoder 107 had already read the data stored in the memory 105. When the pickup apparatus 102 is moved to the current position, the memory 105 stores the data read by the pickup apparatus 102, and the above-described processes are repeated.

The VBR controller 106 stores the identification number ID at the position where the data DATA1 was recognized, checks the write address WA and read address RA from the memory 105, and outputs the back track jump signal JUMP to the servo unit 103 if the data is predicted to over flow from the memory 105.

When the pickup apparatus 102 is moved to the previous position by one track from the current position, the data read by the pickup apparatus 102 while the pickup apparatus 102 was being moved to the original position are not stored in the memory 105.

When the pickup apparatus 102 reaches the original current position again, the VBR controller 106 checks the identification number ID of the data DATA1 read by the pickup apparatus 102 and outputted from the demodulation and error correction unit 104. If the identification number ID of the data DATA1 is the same as the identification number ID of the data finally written in the memory 105, the VBR controller 106 writes the data DATA1 into the memory 105.

However, since the conventional VBR data processor for a DVD player additionally needs a large memory having a capacity of 4M bytes, a control logic circuit for controlling the memory, and another memory for decoding data by using the MPEG decoder multiple memory is disadvantageously needed. In addition, since the conventional VBR data processor needs additional ICs, it is impossible to fabricate a compact system, thus increasing the fabrication cost.

Furthermore, since it is necessary to provide a controller for controlling the additional memory, the number of parts is increased, further increasing the fabrication cost.

SUMMARY OF THE INVENTION

Accordingly, it is an object of the present invention to provide a VBR (Variable Bit Rate) data processor for a DVD (Digital Video Disc) player which overcomes the aforementioned and other problems encountered in the conventional art.

It is another object of the present invention to provide a VBR data processor for a DVD player which is capable of processing a data having a VBR without using a memory for storing a video data and a control logic circuit for controlling the memory.

To achieve the above and other objects, in accordance with a first embodiment of the present invention, there is provided a VBR data processor for a DVD player which includes a pickup apparatus for reading a data written on a disc, a servo unit for driving the pickup apparatus and for amplifying the data read from the disc, a demodulation and error correction unit for demodulating the data outputted from the servo unit, correcting the error of the demodulated data, and outputting an identification number of the data, a motion picture experts group (MPEG) decoder for storing the data from the demodulation and error correction unit into an internal memory after the MPEG decoder and decoding the same and for outputting a full signal when the internal memory is full, and a variable bit rate (VBR) controller for receiving the full signal from the MPEG decoder, applying a back track jump signal to the servo unit, comparing the previously stored identification number with the identification number from the demodulation and error correction unit, and outputting an effective signal to the MPEG decoder based on the comparison results so that the data from the modulation and error correction unit is not stored into the MPEG decoder when the internal memory is full.

To achieve the above and others objects, in accordance with a second embodiment of the present invention, there is provided a VBR data processor for a DVD player which includes a pickup apparatus for reading a data written on a disc, a servo unit for driving the pickup apparatus and for amplifying the data read from the disc, a demodulation and error correction unit for demodulating the data outputted from the servo unit, correcting the error of the demodulated data, and outputting an identification number of the data, and a motion picture experts group (MPEG) decoder for storing the data from the demodulation and error correction unit into an internal memory, and decoding the data previously stored in the memory so that the data is not stored in the memory while the pickup apparatus is back-jumping and scanning the previously read data when the internal memory is full.

To achieve the above and other objects, there is provided a VBR data processing method for a DVD player which includes the steps of reading a data written on a disc and storing the data into a memory of an MPEG decoder; back-track-jumping by using a pickup apparatus when the the memory is full, stopping a data storing process into the memory of the MPEG decoder when the pickup apparatus scans the previously read data, and outputting the data which was previously stored in the memory; and storing the data into the memory of the MPEG decoder when the pickup apparatus arrives at the original position prior to jumping.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Figure 1:
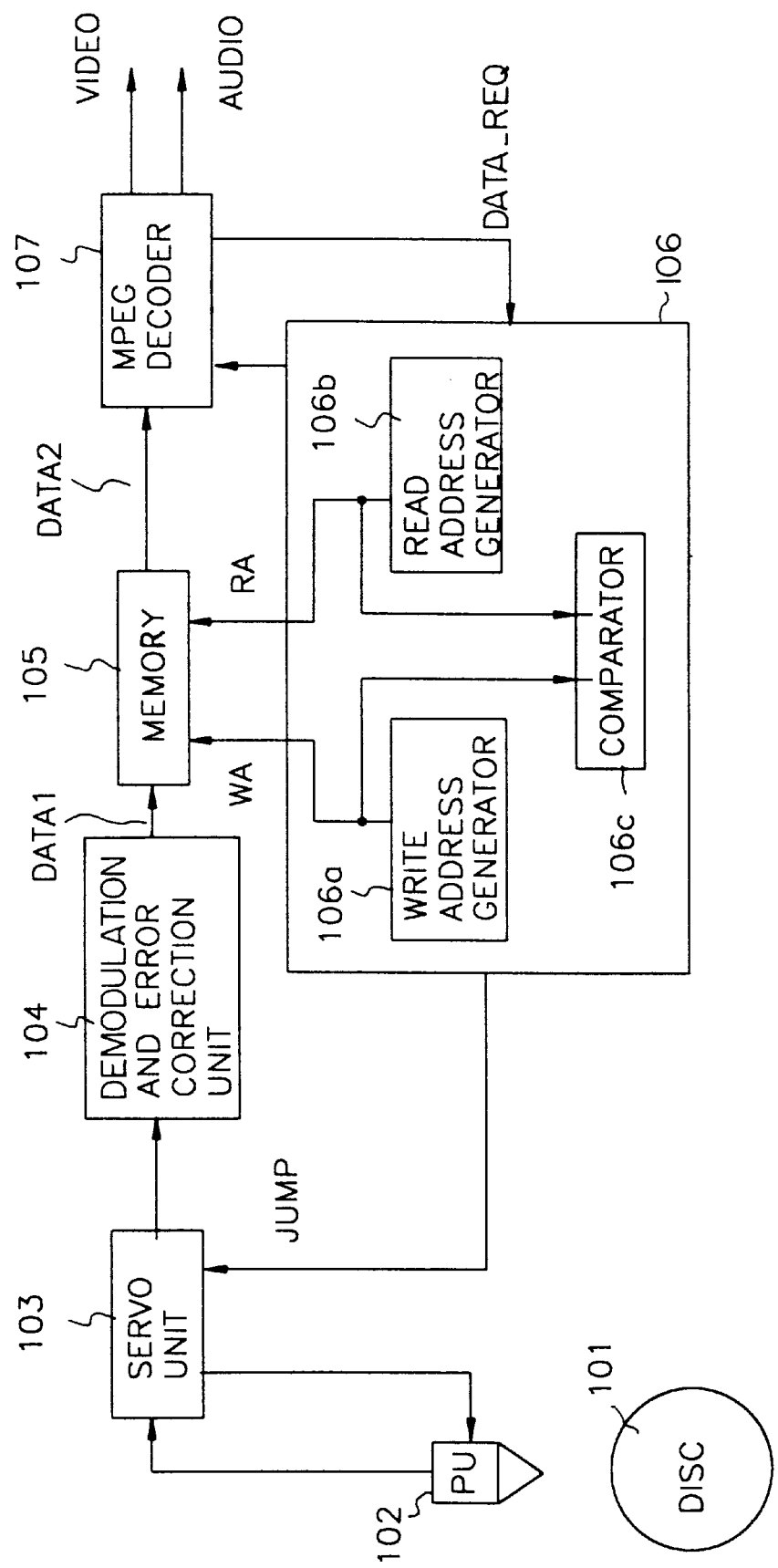
FIG. 1 is a block diagram illustrating a conventional VBR data processor for a DVD player.
Figure 2:
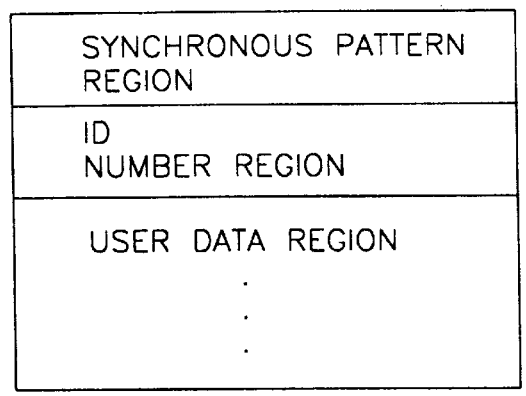
FIG. 2 is a diagram illustrating the construction of a data stored in a disc of FIG. 1.
Figure 3:
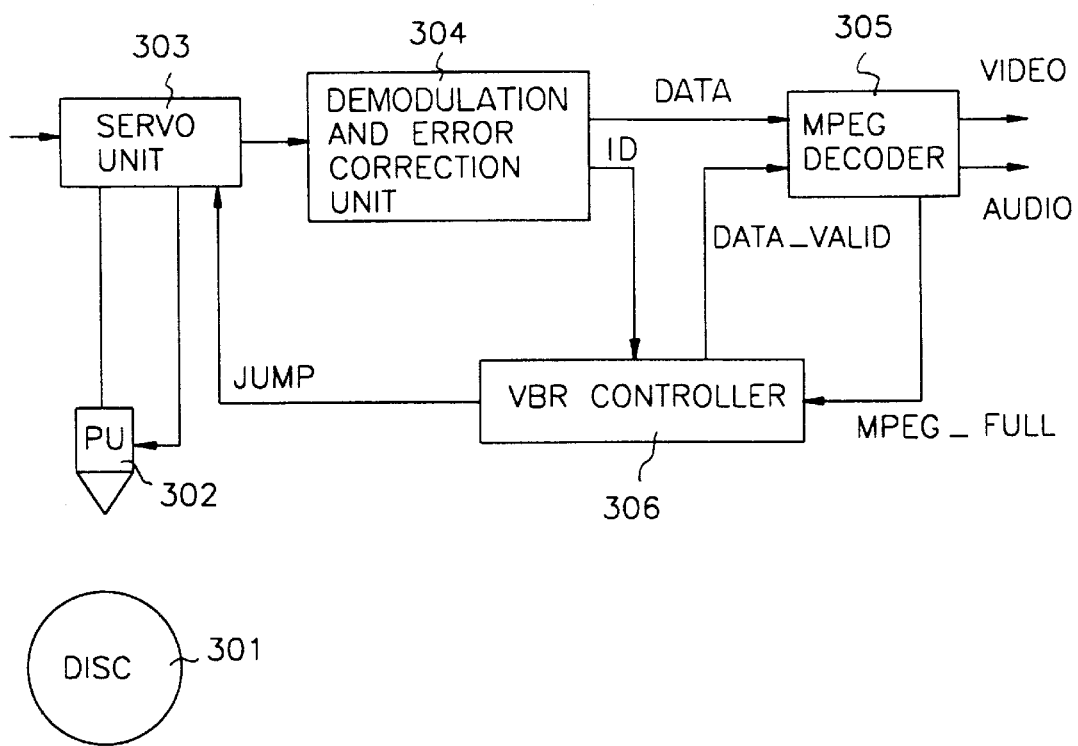
FIG. 3 is a block diagram illustrating a VBR data processor for a DVD player according to the present invention.

FIG. 3 is a block diagram illustrating a VBR data processor for a DVD player according to the present invention.

As shown therein, the VBR data processor for a DVD player according to the present invention includes a pickup apparatus 302 for reading a data written on a disc 301, a servo unit 303 for driving the pickup apparatus 302 and amplifying the data read from the disc 301, a demodulation and error correction unit 304 for demodulating the data from the servo unit 303, correcting the error of the demodulated data, and outputting an identification number ID of the data DATA, an MPEG (Motion Picture Experts Group) decoder 305 for storing the data DATA from the demodulation and error correction unit 304 into an internal memory of the MPEG decoder 35 and decoding the stored data, and outputting a full signal MPEG_FULL when the data is overflown from the internal memory, and a VBR (Variable Bit Rate) controller 306 for receiving the full signal MPEG_FULL from the MPEG decoder 305, comparing the previously stored identification number with the current identification number ID from the demodulation and error correction unit 304, outputting an effective signal DATA_VALID to the MPEG decoder 305 based on the comparison results, and outputting a back track jump signal JUMP to the servo unit 303 when the internal memory is full.

Figure 4:
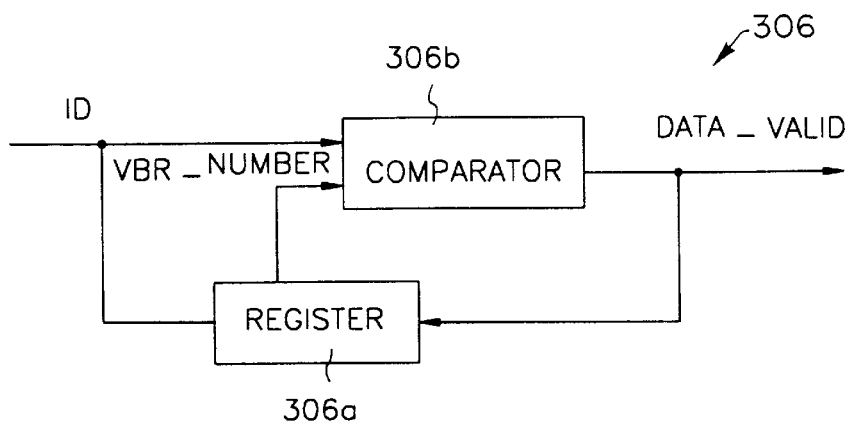
FIG. 4 is a block diagram illustrating a comparator and a register of the VBR data controller of FIG. 3.

The VBR controller 306, as shown in FIG. 4, includes a register 306a for storing the identification number ID of the data DATA from the demodulation and error correction unit 304 and for outputting a signal VBR_NUMBER corresponding to the stored identification number ID, and a comparator 306b comparing the signal VBR_NUMBER from the current register 306a with the identification number ID of the data DATA from the demodulation and error correction unit 304 and for outputting an effective signal DATA_VALID to the MPEG decoder 305 based on the comparison results.

The operation and effects of the VBR data processor for a DVD player according to the present invention will now be explained with refernece to the accompanying drawings.

Figure 5A:
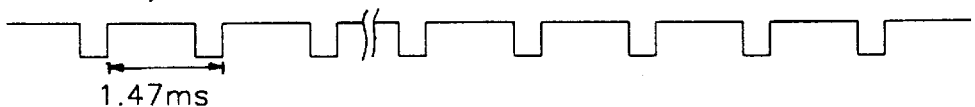
FIGS. 5A through 5F are waveforms of signals from each element of a VBR data processor for a DVD player according to the present invention.

When the pickup apparatus 302 is driven in accordance with the control of the servo unit 303, the data written on the disc 301 is read. The data of one block and one sector is read from the disc 301 and is transmitted to the servo unit 303 through the pickup apparatus 302 whenever the synchronous signal SYNC of one block and one sector, as shown in FIG. 5A, is outputted from the disc 301 and converted to a low level.

The servo unit 303 amplifies the data inputted, and outputs the data to the demodulation and error correction unit 304. The demodulation and error correction unit 304 outputs the data DATA to the MPEG decoder 305, and the identification number ID of the data DATA, as shown in FIG. 5B, is outputted to the VBR controller 306.

Figure 5B:
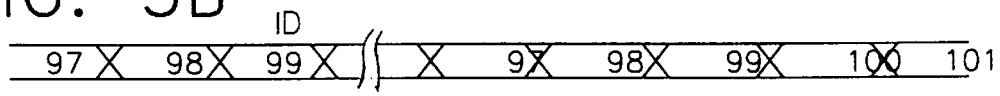
Figure 5C:
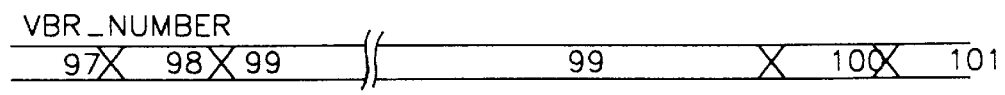
Figure 5D:
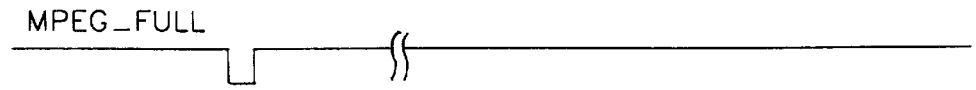
Figure 5E:
Figure 5F:
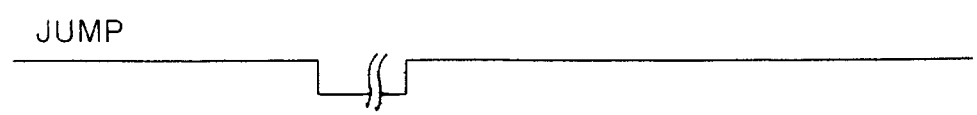

If the internal memory of the MPEG decoder 35 is full, the MPEG decoder 305, as shown in FIG. 5D, outputs a full signal MPEG_FULL to the VBR controller 306, and the VBR controller 306, as shown in FIG. 5E, converts the high level effective signal DATA_VALID to a low level signal and outputs the signal to the low DATA_VALID MPEG decoder 305 to at this time the MPEG decoder 305 stops storing the data DATA from the demodulation and error correction unit 304, and decodes the previously stored data.

In addition, when the VBR controller 306 receives the full signal MPEG_FULL, the identification number ID lastly outputted from the modulation and error correction unit 304 is stored in the register 306a, where the identification number ID, as shown in FIG. 5B, is inputted into the register 306a, and the identification number "99" becomes the initial identification number ID for the register 306a.

The initial register 306a outputs the identification number (ID or VBR_NUMBER) as shown in FIG. 5C to the comparator 306b, and the VBR controller 306 outputs the back track jump signal JUMP to the servo unit 303 so that the pickup apparatus 302 is moved by a predetermined track and is returned number of tracks to the start position (e.g., ID=97).

While the pickup apparatus 302 is being moved to the start position, the MPEG decoder 305 decodes the previously stored data and outputs the data to the outside (emptying at least a portion of the internal memeory), so that the over-flowing of the data is prevented. Here, the modulation and error correction unit 304 outputs the identification number ID corresponding to the previous data to the comparator 306b of the VBR controller 306, and the register 306a of the VBR controller 306 continuously outputs the signal VBR_NUMBER corresponding to the lastly stored identification number ID to the comparator 306b.

When the pickup apparatus 302 returns to the original last position before the jumping was performed, the comparator 306b of the VBR controller 306 compares the stored identification number (ID or VBR_NUMBER) with a new identification number ID received from the demodulation and error correction unit 304. As a result of the comparison, if the stored identification number (ID or VBR_NUMBER) and the new, current identification number ID are identical, the low level effective signal DATA_VALID is converted to a high level and is outputted to the MPEG decoder 305, so that the MPEG decoder 305 resumes storing the data DATA from the demodulation and error correction unit 304 again. Reading of the data stored in the internal memory is prevented by the jumping operation of the pickup apparatus 302, and the data from the position in which the jumping is performed is continuously outputted to the MPEG decoder 305.

For example, the identification number ID stored in the register 306a of the VBR controller 306 is "99" before the pickup apparatus 302 jumps, the data sectors up to "99" are transmitted to the MPEG decoder 305.

Once the pickup apparatus 302 jumps to the start position and is moved continuously to the position before jumping, the identification number "99" is read and inputted to the register 306a. The comparator 306b of the VBR controller 306 receives the ID "99" and compares it with the stored ID "99". Since they are identical, the comparator 306a outputs the high level effective signal DATA_VALID to the MPEG decoder 305.

Thereafter, the data from the data DATA having the next identification number "100" is transmitted to the MPEG decoder 305.

As described above, the VBR data processor for a DVD player according to the present invention is capable of processing a VBR data by using a memory included in the MPEG decoder without using another memory for storing a data read from a disc and a control logic circuit for controlling the memory, thus fabricating a compact system and reducing the fabrication cost.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. An apparatus for reproducing data from a recording medium, the apparatus comprising:

a demodulation and error correction unit for demodulating the data output from the recording medium;

a decompressing decoder for storing the data directly received from the demodulation and error correction unit into an internal memory provided in the decompressing decoder, decoding the stored data and outputting a memory status signal based on an amount of data stored in the internal memory of the decompressing decoder; and a controller for controlling reproduction of the data from the recording medium based on the memory status signal, wherein the controller includes:

a first unit for providing a back track jump signal to a servo control unit based on the memory status signal so that the amount of data stored in the internal memory is maintained within a predetermined range;

a second unit for comparing data reproduced at a back-jumped position with data previously stored in the internal memory; and a third unit for controlling decoding of the data stored in the internal memory based on a comparison result by the second unit.

2. The apparatus as claimed in claim 1, wherein the decompressing decoder is motion picture experts group (MPEG) decoder.

3. The apparatus as claimed in claim 1, wherein the controller includes:

a register for storing an identification number corresponding to the data; and a comparator for comparing the identification number stored in the register with an identification number currently reproduced by the reproducing unit and generating a signal to the decompressing decoder based on a comparison result from the comparator.

4. An apparatus for reproducing data, comprising:

a reproducing unit reproducing data from a medium, each data including an identification number corresponding to said each data;

a decoder including an internal memory, storing the data from the reproducing unit in the internal memory, decoding the data stored in the internal memory, and generating a first signal indicating that the internal memory is full; and a controller receiving the first signal from the decoder, generating a jump signal to the reproducing unit based on the first signal to move a reader of the reproducing unit from the current position to a predetermined prior position on the medium, generating a second signal to the decoder for instructing the decoder to stop storing therein the data received from the reproducing unit based on the first signal, and generating a third signal to the decoder when the reader reaches said current position on the medium from the predetermined prior position, the third signal representing instructions to resume storing of the data from the reproducing unit into the internal memory of the decoder.

5. The apparatus of claim 4, wherein the decoder is a motion picture experts group (MPEG) decoder.

6. The apparatus of claim 4, wherein the reproducing unit includes:

the reader;

a servo unit for controlling the reader and providing the read data; and a demodulation and error correction unit for demodulating the data from the servo unit, correcting an error of the demodulated data, and outputting the data with the identification number.

7. The apparatus of claim 4, wherein the controller includes:

a register for storing the identification number corresponding to the data; and a comparator for comparing the identification number stored in the register with the identification number currently reproduced by the reproducing unit and generating one of the second and third signals to the decoder based on a comparison result from the comparator.

8. The apparatus of claim 4, wherein the second signal is a low level signal and the third signal is a high level signal.

9. The apparatus of claim 4, wherein upon receipt of the second signal from the controller, the decoder decodes the last data stored in the internal memory of the decoder to empty at least a portion of the internal memory.

10. A method for reproducing data, comprising the steps of:

reproducing data from a medium using a reader, each data including an identification number corresponding to said each data;

storing the reproduced data in an internal memory of a decoder;

decoding the data stored in the internal memory;

generating a first signal indicating that the internal memory is full when the internal memory is full;

moving the reader from the current position to a prior position on the medium based on the first signal;

generating a second signal to the decoder for instructing the decoder to stop storing the data in the internal memory based on the first signal; and generating a third signal to the decoder to resume storing of the data in the internal memory when the reader reaches said current position on the medium from the prior position after the first signal is generated.

11. The method of claim 10, wherein in the decoding step, the decoder is a motion picture experts group (MPEG) decoder.

12. The method of claim 10, wherein the reproducing step includes:

reading the data from the medium;

controlling the reader;

demodulating the data from the reading step;

correcting an error of the demodulated data; and outputting the corrected data with the identification number.

13. The method of claim 10, wherein the step of generating the third signal includes:

storing the identification number corresponding to the data last read before the reader is moved in the moving step;

comparing the stored identification number with the identification number currently reproduced in the reproducing step; and generating one of the second and third signals to the decoder based on a comparison result.

14. The method of claim 10, wherein the step of generating the second signal generates a low level signal and the step of generating the third signal generates a high level signal.

15. The method of claim 10, wherein in the step of generating the second signal, the decoder decodes the last data stored in the internal memory of the decoder to empty at least a portion of the internal memory.

* * * * *